United States Patent [19]

Altman

[11] 4,386,375
[45] May 31, 1983

[54] VIDEO DISC PLAYER WITH MULTIPLE SIGNAL RECOVERY TRANSDUCERS

[75] Inventor: Ted N. Altman, East Windsor, N.J.

[73] Assignee: RCA Corporation, New York, N.Y.

[21] Appl. No.: 190,275

[22] Filed: Sep. 24, 1980

[51] Int. Cl.³ .................. H04N 9/491; H04N 5/76; G11B 5/012

[52] U.S. Cl. ........................... 358/327; 358/342; 360/86

[58] Field of Search .............. 358/4, 128.5, 128.6, 358/310, 320, 342, 322, 327; 360/86; 369/43, 47, 59

[56] References Cited

U.S. PATENT DOCUMENTS

| | | | |
|---|---|---|---|
| 3,641,278 | 2/1972 | Kinjo et al. | 358/86 |
| 3,646,261 | 2/1972 | Kinjo et al. | 178/6.6 DD |
| 3,649,752 | 3/1972 | Kinjo | 358/97 X |
| 3,705,262 | 12/1972 | Kennedy et al. | 358/105 |
| 3,757,030 | 9/1973 | Lynott et al. | 358/86 |
| 3,842,194 | 10/1974 | Clemens | 358/127 |
| 3,911,484 | 10/1975 | Mutou et al. | 360/35 |
| 3,914,542 | 10/1975 | Boltz, Jr. | 358/128.6 |
| 3,914,791 | 10/1975 | Stebe | 360/103 |
| 3,946,367 | 3/1976 | Wohlmut et al. | 340/173 LM |
| 3,965,482 | 6/1976 | Burrus | 358/8 |
| 3,969,756 | 7/1976 | Palmer et al. | 358/4 |
| 3,972,064 | 7/1976 | Keizer | 358/4 |
| 4,000,510 | 12/1976 | Cheney et al. | 360/33 |
| 4,056,830 | 11/1977 | Smith | 360/51 |
| 4,094,013 | 6/1978 | Hill et al. | 365/234 |
| 4,138,741 | 2/1979 | Hedlund et al. | 365/234 |
| 4,142,209 | 2/1979 | Hedlund et al. | 358/128.5 |
| 4,199,820 | 4/1980 | Ohtake et al. | 365/234 |
| 4,217,612 | 8/1980 | Matla et al. | 360/78 |
| 4,313,134 | 1/1982 | Rustman et al. | 358/128.5 |

OTHER PUBLICATIONS

"RCA Selectavision Videodisc SFT 100 Player Manual", RCA Corp., Sherman Drive, Indianapolis, Indiana 46201, 1980.
RCA Review, vol. 39, Mar. 1978, pp. 208-216.

*Primary Examiner*—Aristotelis M. Psitos
*Attorney, Agent, or Firm*—E. M. Whitacre; J. S. Tripoli; E. P. Herrmann

[57] ABSTRACT

A video disc playback apparatus for recovering signal from disc records having radially aligned information fields is provided with multiple signal recovery transducers for interactive signal playback. The signal recovery transducers are independently translated to information fields having like synchronization signal components responsive to player program controls and recovered track identification signals. Synchronization signal components recovered by the various transducers are compared to generate an error signal for activating further transducer means to translate the signal recovery transducers tangentially along the prerecorded information tracks and thereby adjust the relative angular location of the signal recovery transducers to reduce the phase differential of the synchronization components of signal between the respective signals and thereby precluding the need for independent frame synchronization apparatus.

6 Claims, 5 Drawing Figures

VIDEO DISC PLAYER WITH MULTIPLE SIGNAL RECOVERY TRANSDUCERS the subject invention is generally related to a video disc player and in particular, to a player having multiple transducers for simultaneous or selective recovery of prerecorded signals from different areas of the disc record.

Interactive TV systems of the type wherein a user programs a sequence of visual displays have heretofore typically required a multiplicity of signal storage and playback devices, each device containing particular segments of the variety of segments available to the user. The user selects the sequence and each storage and playback device outputs its particular signal segment, which signal segments are multiplexed to a common display device for viewing. In order to accomplish the multiplexing without undesirable visual disturbances, e.g., picture roll, it is necessary to incorporate a frame synchronizer in the system to condition the signal received from each playback device to be synchronized with the signal from every other playback device. Because frame synchronizers are expensive items, the availability of such interactive devices is limited. For an example of an interactive system, consider a tourist information center having all of the tourist attractions and the access routes to the attractions, from the perspective of an auto passenger, recorded on a disc record. The access routes between route intersections and the attractions are recorded as respective separate segments on the disc. The tourist desiring to see certain attractionsperforms certain user-oriented system commands and the tourist is guided on the viewing screen along the most desirable route to the attractions he wishes to visit. It is desirable that the viewed images be continuous, thus, at the end of each recorded segment the system should immediately switch to the beginning of the next appropriate segment and be synchronized therewith so the picture does not tear or roll, etc.

A video disc record having multiple frames recorded per convolution or circular track, and in particular, a disc having 4 frames per track which are radially aligned and recorded in NTSC signal format enables one to construct a video disc player having interactive capability without requiring a frame synchronizer. In the NTSC signal format, the synchronizing components of the signal are in-phase every 4th field. A disc having 4 radially aligned frames per convolution has in-phase fields diametrically opposed on the record. Thus, signal recovery transducers which engage the disc record 180° apart recover signal with in-phase synchronizing components. Interactive capability is effected by directing a first transducer to a particular track in field 1, frame 3 while a second transducer is currently recovering information from a different or the same track in field 1, frame 1. As long as the transducers are maintained separated by 180°, the signals recovered by both transducers are in phase due to the recording format and the commonality of the signal rotating storage medium being engaged by two fixed signal recovery transducers.

Assuming that each track or convolution of recorded information is identifiable the user can condition either transducer to search for a given track containing a particular segment of information while the other transducer is recovering signal from a previously selected segment at a different radial location on the disc.

The present invention comprises an interactive video disc player for use with video disc records, recorded with multiple TV frames of video information per information track convolution and with the frames in adjacent tracks being radially aligned. The player comprises a base having a turntable for rotatably supporting the disc record at a substantially constant angular velocity. A first signal recovery transducer engages the disc at a substantially fixed angular position, which transducer is supported in a carriage assembly for translating the transducer in a radial direction with respect to the disc record. A second signal recovery transducer engages the disc record at a substantially constant angular displacement from the first transducer and is positioned to engage the disc at a particular field location within a particular TV signal frame with respect to the field and frame engaged by the first transducer. The second signal recovery transducer is supported in a second carriage assembly for translating the second transducer in a substantially radial direction across the disc. A user oriented program unit provides control of the first and second transducer carriage assemblies to search and play desired recorded signal segments in a user programmed sequence. Recovered signal from the first and second signal recovery transducers are multiplexed to common processing circuitry for transmission to and display on a TV receiver without external frame synchronization circuitry.

Figure 1:
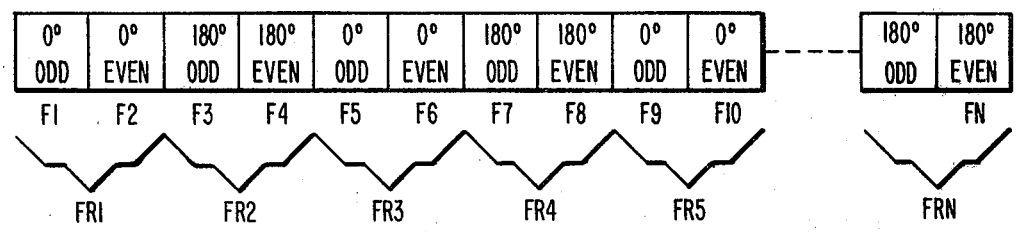
FIG. 1 is a diagrammatic representation of an NTSC signal field sequence.

In FIG. 1, F1 to FN designate artibrary fields and FR1 and FRN designate artibrary frames as sequentially produced in an NTSC television signal. The odd fields F1, F3, etc. begin with a half horizontal raster line and the even fields F2, F4, etc. each begin with a whole horizontal raster line of video information. The angular designation of the particular field refers to the chroma burst signal referenced to an arbitrary standard. Alternate frames are seen to be 180° out of phase relative to each other. Thus, every fourth field, i.e., Field F1, F5, F9, etc. have similar horizontal timing features and similar chroma burst phasing. The vertical blanking interval of all fields are similar.

Figure 2:
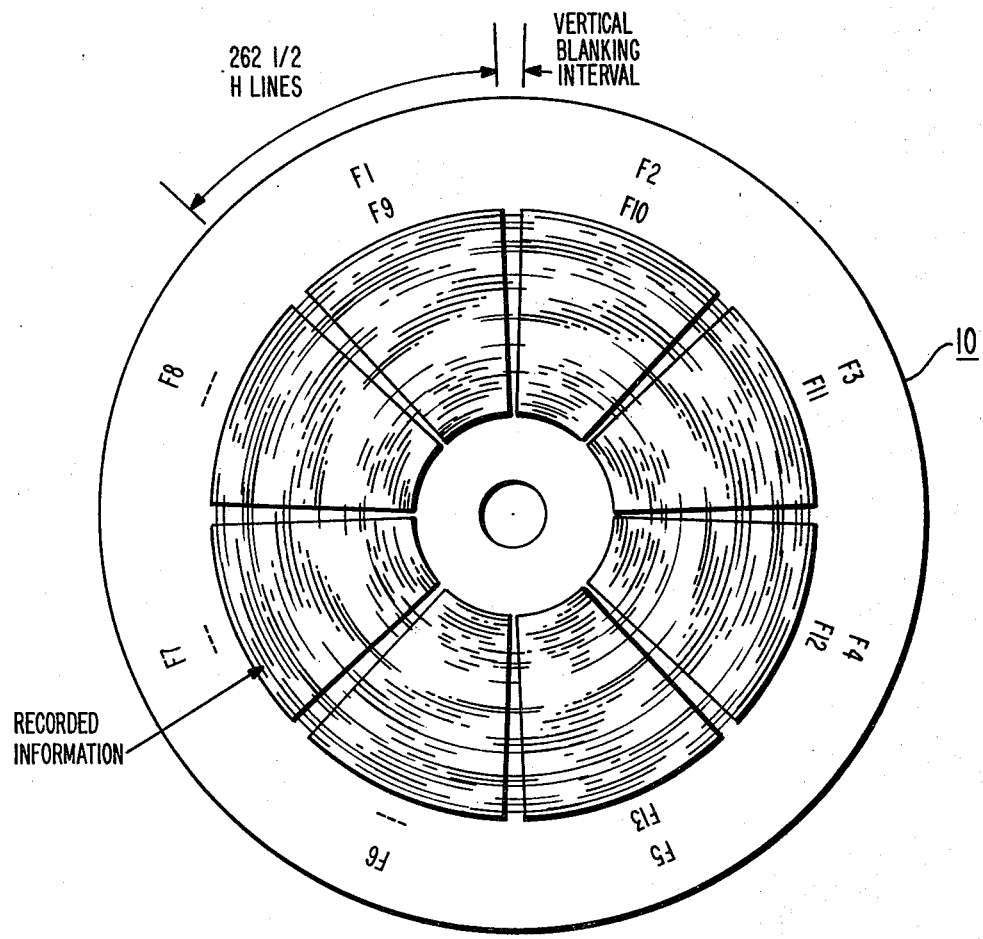
FIG. 2 is a diagrammatic representation of a video disc record having multiple frames per convolution and radially aligned.

FIG. 2 illustrates a video disc record 10 formatted for recording video and sound signals for display on a NTSC receiver. The signal may be recorded in closed concentric circular tracks or in a continuous spiral track. Four frames of video signal are recorded in a single convolution or circular track, each frame being divided into an odd and an even field, with the fields from track to track being radially aligned, i.e., the beginning of every eighth field occurs at the same angular coordinate. The designations F1 to FN illustrate the sequence in which successive fields are recorded. Fields which are diametrically opposite have like timing and phase relationships for an NTSC recording. Therefore, if signal is being recovered from the record at "x" degrees from field F1 and being displayed on an NTSC TV receiver, an instantaneous switch to signal recovered from field F5 at x+180° will be synchronous therewith and not upset the synchronization of the receiver, and similarly for signal recovered from any of the radial locations at x+N180 degrees where N is an integer.

Figure 3:
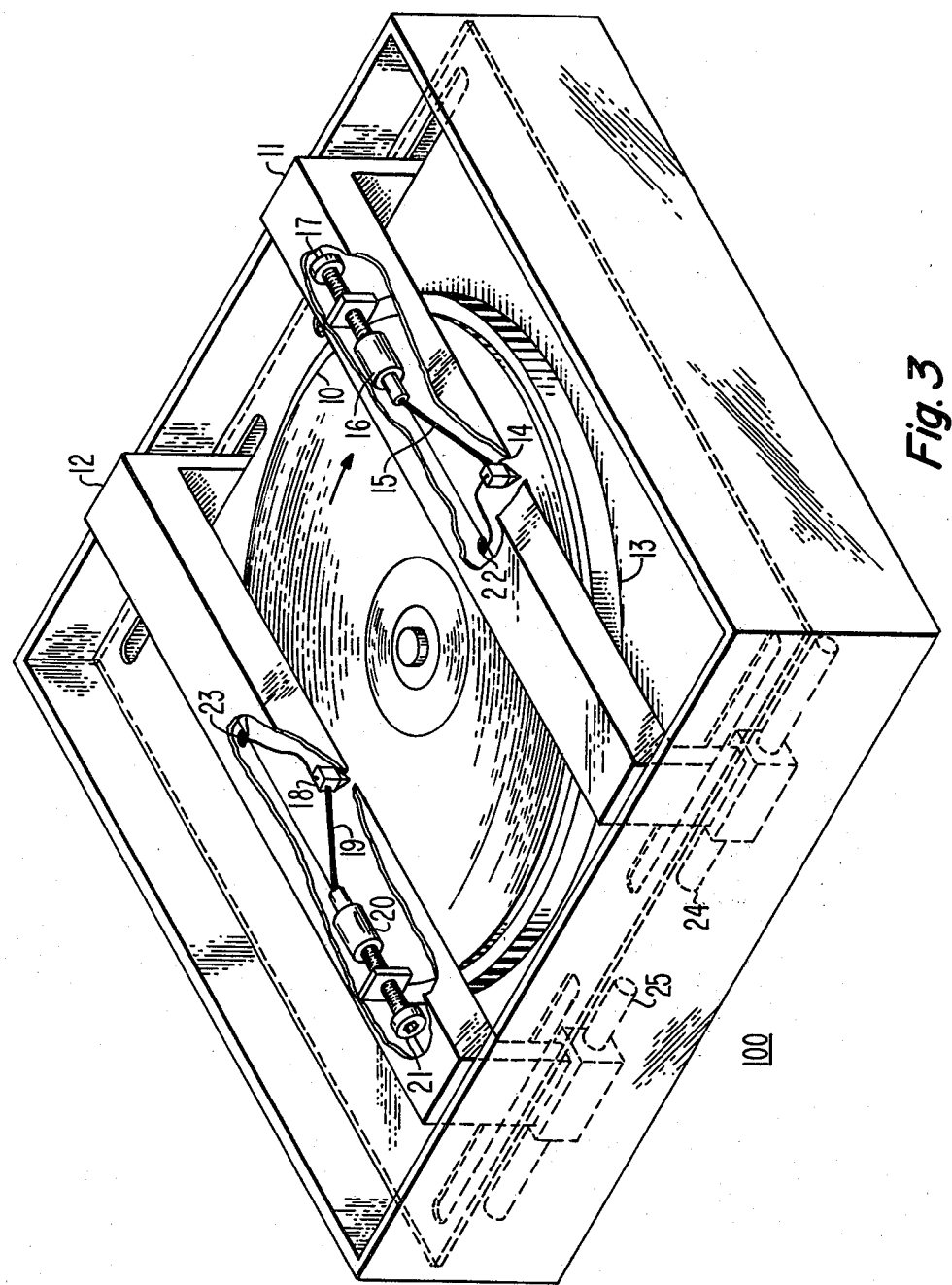
FIG. 3 is a schematic diagram of a video disc player apparatus having two signal recovery transducers.

A video disc player arranged to receive the disc record 10 and having first and second signal recovery transducers which address the disc at x degrees and x+180 degrees for switching between the signals recovered by the first and second transducers without the need of a frame synchronizer is illustrated in FIG. 3. Player 100 comprises a turntable 13 for rotatably supporting the disc record 10. A first signal pickup stylus 14, which engages disc record 10, is secured to the free end of stylus arm 15, the second end of which is coupled to an armstretcher transducer 16. Stylus 14, connected via terminal 22 to pickup circuitry (not shown), cooperates therewith to recover signal prerecorded on the disc. The armstretcher 16, which imparts a controlled translation to the pickup stylus tangentially along the information track on the disc to maintain the stylus-disc relative velocity substantially constant, is secured to an arm carriage 11 for translating the stylus-armstretcher assembly in a radial direction relative to the disc. The arm carriage 11 is propelled by a first motive means (not shown) and the carriage is constrained to motion along the rail 24. A second signal recovery stylus 18 coupled to stylus arm 19 and armstretcher 20 is supported in the second arm carriage 12, which carriage is constrained to move along rail 25. Stylus 18 cooperates with respective pickup circuitry via terminal 23. The armstretcher-stylus assemblies are provided with respective adjusting devices 17 and 21 for manually positioning the two styli at an angular displacement on the disc record of 180°. Note that the system concept is equally applicable to players utilizing optical signal recovery transducers and optical discs.

Figure 4:
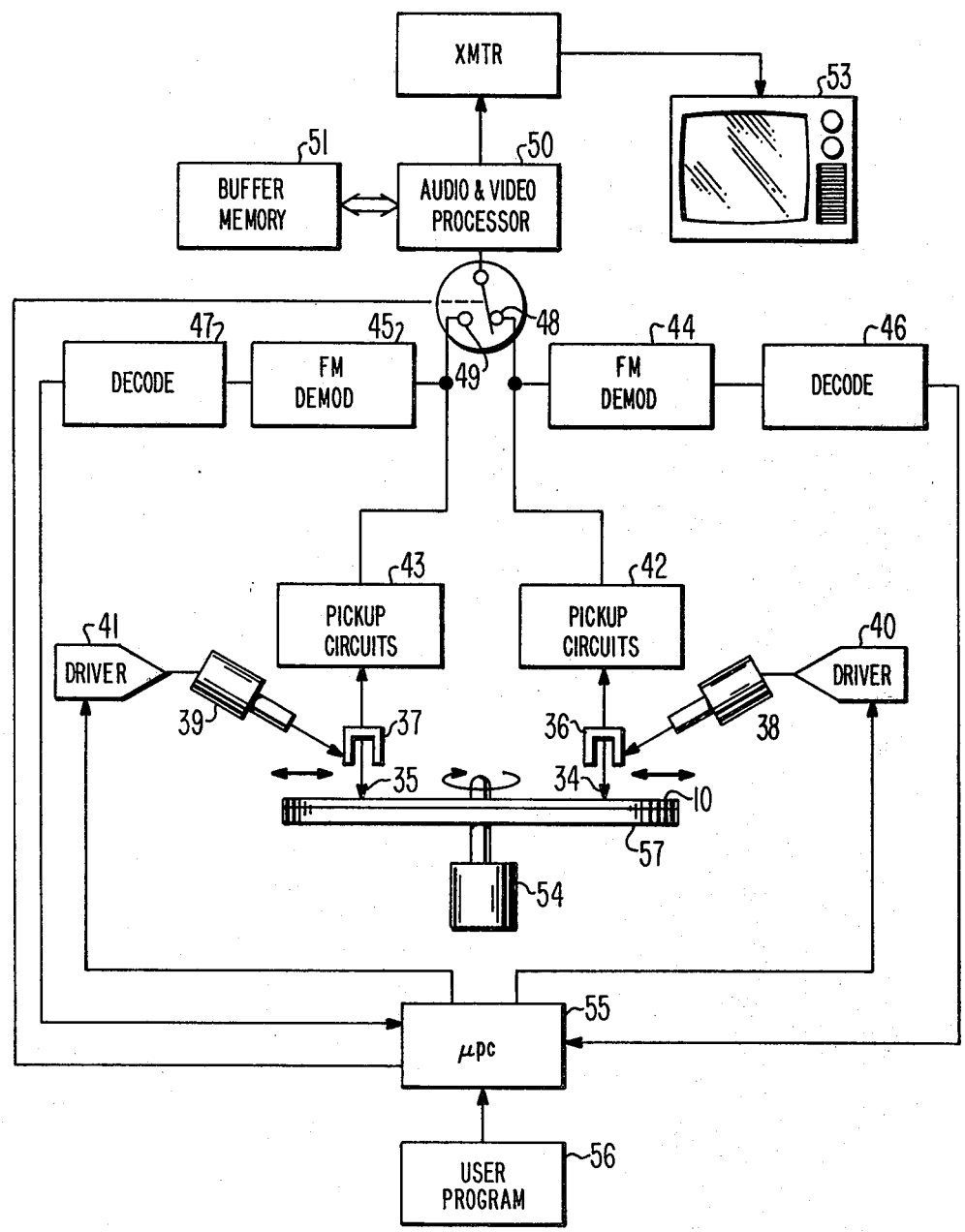
FIG. 4 is a block diagram of video disc player circuitry having two signal recovery transducers.

FIG. 4 illustrates an interactive video disc player premised on the recorded video signal containing field or frame identifying numbers, e.g., coded numbers located in the vertical blanking intervals, (see U.S. Pat. No. 4,142,209 incorporated herein by reference) and a user index of particular video frames referenced to the frame identification numbers.

The player comprises a base 57 for rotatably supporting the disc record 10 and a motor 54 which drives the base at a constant angular velocity. First and second signal pickup styli 34 and 35 engage the disc record displaced by 180° thereon. The first and second styli are respectively supported by carriage assemblies 36 and 37 and are independently translated radially across the disc by motors 38 and 39, respectively. Arm carriage motors 38 and 39 are energized respectively by driver circuits (e.g., power amplifiers) 40 and 41 under the control of microprocessor 55.

Pickup circuitry 42 cooperates with stylus 34 to recover information from the disc at its particular radial location. Typically, the signal recovered will be in FM format and applied to terminal 48. Similarly, pickup circuitry 43 cooperates with stylus 35 to produce an FM signal at terminal 49. Signal pickup circuitry of the type appropriate for use in the capacitive video disc system is described in U.S. Pat. No. 4,080,628 entitled "Pickup Circuitry for a Video Disc Player with Printed Circuit Board." Signal from either terminal 48 or 49 is selectively applied under the control of microprocessor 55 to the audio and video processing circuitry 50 which conditions the signal for transmission to the antenna terminals of a standard TV receiver 53.

An optional buffer memory 51 is included for storing a particular field or frame of video signal for repeated play in the event the searching stylus has not reached its desired disc location before the playing stylus has completed recovery of its present signal segment.

Signal recovered by styli 34 and 35 are respectively demodulated in FM demodulators 44 and 45. The frame or field identifying components of the demodulated signals are decoded in respective decoder circuits 46 and 47 and applied for use by the microprocessor 55. In accordance with the decoded track numbers indicative of the respective styli's present disc location and a set of instructions entered by the user via the user program controller 56 derived from the disc index, the two arm carriages and thereby the styli are alternately directed to different disc locations. The user, either prior to playback or during playback responsive to visual stimuli from signal presently being recovered from the disc 10 and displayed on receiver 53, enters a set of instructions via input controller 56 to cause the microprocessor 55 to sequentially direct the signal recovery transducers to the desired signal segments. While one stylus plays back signal from a particular disc segment the other stylus operates in a search mode to locate the requisite track containing the next succeeding desired information segment, and vice versa.

In order to switch instantaneously between signals from diametrically opposite fields and to preclude loss of synchronizaton in the receiver the two styli should ideally be displaced exactly 180° on the disc record. Typically, however, receivers have a narrow range wherein they will operate without losing synchronization, which range is less than one horizontal line. Consider a disc record having 8 fields per track convolution, 262½ horizontal lines per field and a minimum track radius of three inches. One horizontal line occupies approximately 0.009 inch or 0.17 degrees in the track having the three inch radius. At any particular radial position of the two styli, they can easily be displaced by 180° to within a small percentage of one horizontal line. But unless the two carriage assemblies and their corresponding rails, etc. are precisely aligned, the 180° displacement will not be maintained for random radial positions of the two styli.

In addition, track eccentricity and/or recording defects or errors may cause the diametrically opposite field to be different from a 180° synchronous position. The angular synchronous position may in fact vary for each radial track position.

Figure 5:
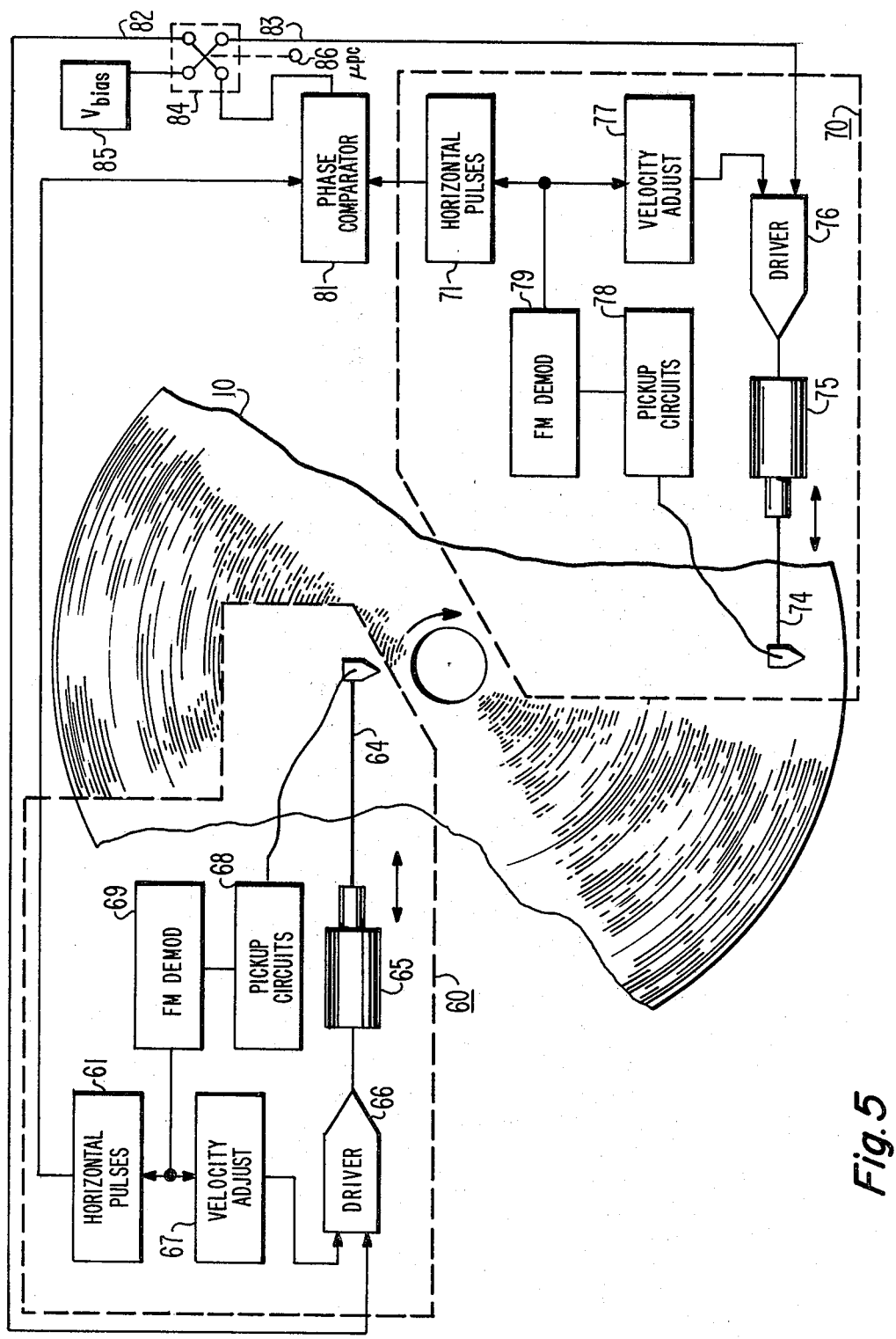
FIG. 5 is a block diagram of circuitry for phase locking two signal recovery transducers engaging the same disc record.

The system shown in FIG. 5 will adaptively lock the position of the two styli at signal synchronization for limited relative run out of the two carriage assemblies. In FIG. 5 two similar subsystems 60 and 70 each comprise a respective signal pickup stylus 64 (74) coupled with pickup circuitry 68 (78) for recovering prerecorded signals from disc record 10. Pickup circuitry 68 (78) applies the recorded signal to the FM demodulator 69 (79) for demodulating such signal. Velocity adjusting circuitry 67 (77) monitors the chroma burst component of the demodulated signal to ascertain the relative disc-stylus velocity and responsive thereto generates a control signal to driver circuit 66 (76) to energize an electromechanical armstretcher transducer 65 (75) to move the stylus in a direction along the information track and correct for undesirable velocity deviations (see U.S. Pat. No. 3,965,482 entitled "Velocity Correction Circuit for Video Disc"). Circuitry 61 (71) extracts the horizontal blanking pulses from the demodulated signal and applies the extracted pulses to the phase comparator 81. Output signal from the phase comparator corresponding to the phase difference between the horizontal blanking signals recovered by the two styli, is applied to bias the armstretcher driver 66 or 76 of the subsystem 60 or 70 currently in the search mode. The polarity and amplitude of the comparator output signal applied to the requisite driver circuitry 66 (76) conditions the appropriate armstretcher to move the stylus along the signal track in a direction to reduce the phase difference in the horizontal blanking signals and thereby synchronize the signals recovered from the two styli.

A crosspoint switch 84 under microprocessor control via terminal 86 directs the comparator output signal to the connection 82 or 83 for application to the requisite driver 66 or 76. The alternate driver 76 or 66 has a nominal bias potential applied thereto from bias supply 85. Note that the phase comparator output signal may be applied simultaneously to both armstretcher transducers to effect a quicker response time of the system. This arrangement, however, may produce undesirable visual effects due to the stylus which is presently recovering the displayed signal, being moved tangentially along its track. But it has the additional desirable aspect of obviating the crosspoint switch 84 and the bias supply 85.

While the foregoing material is directed to a video disc system designed to operate with NTSC signal format, the invention may be readily adapted by one skilled in the art of recording systems to other standard TV signal formats such as the PAL or SECAM formats (PAL signals cycle through multiples of 8 fields). In addition, it should be recognized that systems having more than two signal pickup transducers may be conceived without straying from the spirit of the invention, e.g., a disc recorded with NTSC signals having 12 fields per convolution may be accessed by 3 transducers, etc.

What is claimed is:

1. A video disc player of the type for recovering video signal from information bearing tracks disposed on a disc record, said video signal being formatted in fields having vertical, horizontal, and chrominance synchronization signal components, every Nth field having similar in-phase synchronization components and wherein M fields are disposed per 360° of the information track, and multiples of every Nth field being radially aligned in adjacent tracks, said player comprising:

a base for rotatably supporting said disc record;
at least two signal recovery systems having respective output terminals and having signal transducers disposed at N/M times 360° or a multiple thereof relative to each other to recover signal from the disc record;
means responsive to the synchronization components of the recovered signals at said output terminals for adjusting the angular position of at least one of the signal transducers relative to at least one other of the signal transducers in a direction to reduce signal phase differential between the synchronization components of signal recovered by said at least one and said at least one other signal transducer;
means for radially translating said signal transducers independently of each other to preselected video signal fields; and
means for selectively applying signal from said respective output terminals to a display means.

2. The video disc player set forth in claim 1 wherein the means for radially translating said signal transducers comprises:

respective carriage means for supporting each signal transducer, each carriage means including means for permitting the respective signal transducer to engage said disc record;
respective motive means responsive to respective carriage control signals for translating the respective carriage means and thereby the respective signal transducers radially with respect to the disc axis of rotation;
respective decoders for extracting field identifying numbers from the respective recovered signals; and
computing means responsive to the recovered and decoded identifying numbers and a sequence of user determined transducer positions for generating carriage control signals to position the appropriate signal transducer at the appropriate information track prior to completion of a current displayed signal segment.

3. The video disc player set forth in claim 1 wherein the means for adjusting the relative angular position of said signal transducers comprises:

respective means for extracting horizontal synchronization pulses from the respective recovered signals;
phase comparator means for generating respective control signals responsive to the phase differential between the horizontal synchronization pulses of the recovered signal currently being displayed on said display device and another of the respective recovered signals; and
respective electromechanical transducer means responsive to said control signals for tangentially translating the other respective signal transducer along the signal information tracks.

4. The video disc player set forth in claim 3 further including:

buffer memory means;
means for selectively connecting one of said output terminals for inputting signal to said buffer memory means; and
means for selectively connecting output signal from said buffer memory means or one of said respective output terminals to said display means.

5. A video disc player comprising:

a base for rotatably supporting a disc record;
first and second transducers for recovering prerecorded signal including synchronizing components from said disc record when the respective transducer engages said disc and relative velocity is maintained therebetween;
first and second carriage means respectively supporting said first and second transducers for selective engagement with the same surface of said disc record;
means responsive to like features of both signals recovered by said first and second transducers for translating at least one of the transducers tangential to an information track on said disc record from which said transducer is currently recovering signal and thereby to align the phase relationship of said like features of signal recovered by the first and second tranducers;
first and second motive means for respectively translating said first and second carriage means and thereby said first and second transducers in directions radially across said disc record independent of one another; and means for controlling said first and second motive means to position the first and second carriage means and thereby the first and second transducers to produce a prescribed sequence of recovered signal segments from said record.

6. The video disc player set forth in claim 5 wherein the means for controlling said first and second motive means comprises:

first and second driver circuits responsive to respective first and second control signals for energizing said first and second motive means respectively;

first and second decoding means for extracting field identification codes from the signal recovered respectively by said first and second transducers, said identification codes indicative of the present position of the transducers;

a microprocessor responsive to user commands and the extracted field identification codes, said microprocessor generating said first and second control signals.

* * * * *